United States Patent
Forsell et al.

(10) Patent No.: US 6,296,433 B1
(45) Date of Patent: Oct. 2, 2001

(54) LARGE DIAMETER TAPCON WITH DEBRIS RESERVOIR END OR TIP

(75) Inventors: David Forsell, Carol Stream, IL (US); Richard J. Ernst, San Diego, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/654,669

(22) Filed: Sep. 5, 2000

(51) Int. Cl.[7] .............................. F16B 25/00; F16B 35/04
(52) U.S. Cl. .................. 411/386; 411/387.2; 411/412
(58) Field of Search ..................... 411/386, 387.1, 411/387.2, 387.3, 387.4, 387.5, 411, 412

(56) References Cited

U.S. PATENT DOCUMENTS

| | | |
|---|---|---|
| 143,217 * | 9/1873 | Barrett .............................. 411/387.1 |
| 1,533,369 | 4/1925 | Blood . |
| 3,045,523 * | 7/1962 | Reed, II ............................ 411/387.1 |
| 3,200,691 | 8/1965 | Neuschotz . |
| 3,937,119 | 2/1976 | Ernst . |
| 3,982,464 | 9/1976 | Sygnator . |
| 4,386,882 | 6/1983 | Bereiter . |
| 4,477,217 | 10/1984 | Bonacorsi . |
| 4,878,793 | 11/1989 | Hewison . |
| 4,973,210 | 11/1990 | Osborne et al. . |
| 5,234,301 | 8/1993 | Grossberndt et al. . |
| 5,281,066 | 1/1994 | Fitz . |
| 5,374,146 | 12/1994 | Allen . |
| 5,499,895 | 3/1996 | Allen . |
| 5,499,896 | 3/1996 | Cafarelli . |
| 5,531,553 | 7/1996 | Bickford . |
| 5,667,443 * | 9/1997 | Allen ................................ 411/386 X |
| 5,730,565 | 3/1998 | Hein et al. . |
| 5,749,689 | 5/1998 | Konig . |
| 5,792,142 * | 8/1998 | Galitzer ........................... 411/386 X |
| 5,800,107 | 9/1998 | Giannuzzi et al. . |
| 5,827,030 | 10/1998 | Dicke . |

FOREIGN PATENT DOCUMENTS

| | | |
|---|---|---|
| 167620 | 8/1921 | (GB) . |
| WO9842989 | 2/1998 | (WO) . |

\* cited by examiner

*Primary Examiner*—B. Dayoan
(74) *Attorney, Agent, or Firm*—Schwartz & Weinrieb (57) ABSTRACT

A masonry anchor is provided with a reaming portion which includes recessed portions for defining reservoir regions for accumulating debris generated by the reaming operation when the anchor is installed within a masonry structure. The accumulation of the debris within the reservoir regions reduces torsional friction and installation torque characteristic of the anchor installation operation. Masonry anchors which are self-tapping or self-threading and which do not have reaming portions operatively associated therewith can also have such recessed reservoir structure defined thereon for such similar dust and debris accumulation and discharge purposes.

33 Claims, 8 Drawing Sheets

LARGE DIAMETER TAPCON WITH DEBRIS RESERVOIR END OR TIP

FIELD OF THE INVENTION

The present invention relates generally to fasteners, and more particularly to a masonry anchor which is provided with a uniquely structured debris reservoir end whereby installation of the anchor fasteners within, for example, pre-drilled bores defined within masonry materials is rendered easier and faster as a result of a significant reduction in the installation torque due to the proper sizing of the bore and the accumulation and efficient discharge of masonry or concrete dust or debris generated during a self-tapping or reaming operation.

BACKGROUND OF THE INVENTION

Anchor type fasteners for attaching, mounting, or securing various objects or devices to masonry structures are of course well known in the art. Prior art fasteners of the aforenoted type usually, for example, comprised one of two types, that is, anchors having expansion structure incorporated therein for expansibly engaging the interior peripheral sidewall of a bore pre-drilled into the masonry structure, or anchors utilizing bonding materials for adhesively bonding to the interior peripheral sidewall of the pre-drilled bore. While both of these types of anchors have of course been operationally satisfactory from the viewpoint of being able to mount, attach, or secure various objects or devices to the masonry structure once such fasteners have themselves been mounted or secured within the bores pre-drilled within the masonry structure, both of such types of anchors are somewhat difficult and time-consuming to install, as well as to remove from the masonry structure if so desired.

Figure 1:
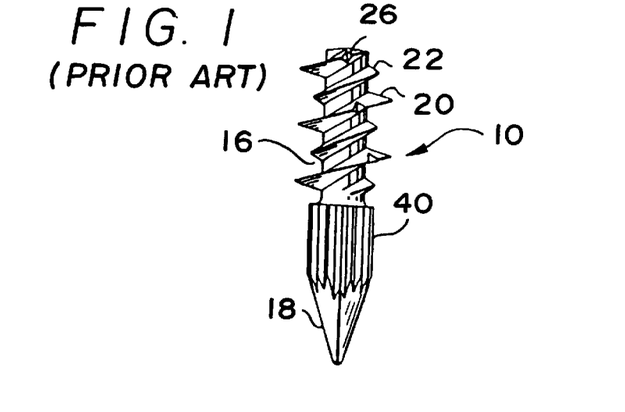
FIG. 1 is a front elevational view of a PRIOR ART masonry anchor having a reaming or sizing portion provided upon a tip region thereof.
Figure 2:
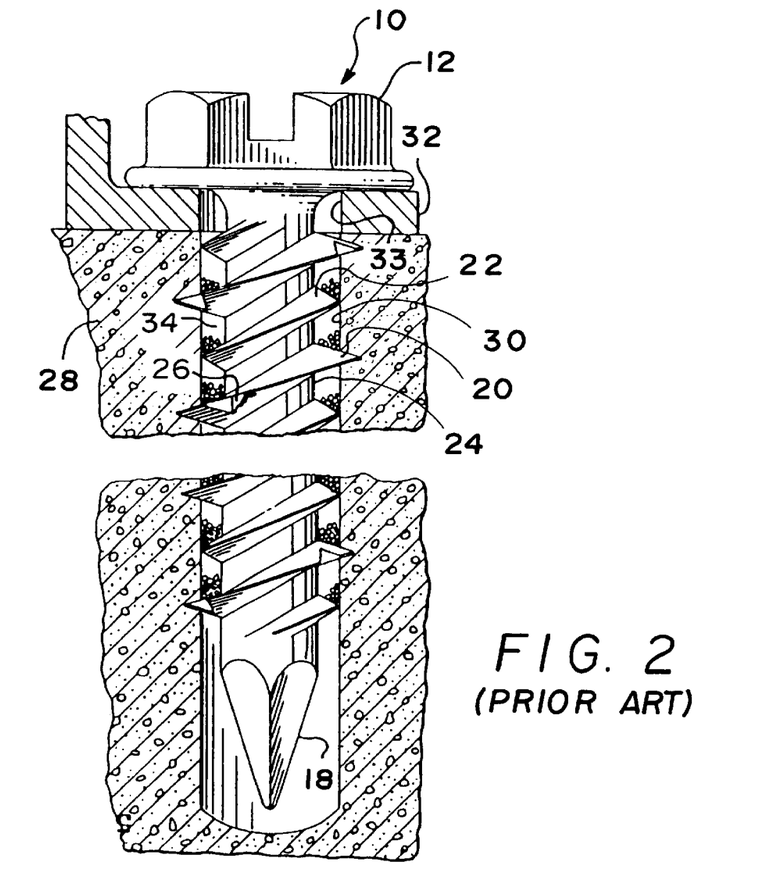
FIG. 2 is a partial cross-sectional view of a PRIOR ART masonry anchor, similar to the PRIOR ART masonry anchor shown in FIG. 1, as inserted within a masonry structure so as to attach a workpiece to the masonry structure.

In order to overcome the aforenoted operational drawbacks, disadvantages, and deficiencies characteristic of such known PRIOR ART masonry anchors, an improved, one-piece masonry anchor of the type disclosed within U.S. Pat. No. 3,937,119, which issued to Ernst on Feb. 10, 1976, was developed. More particularly, as disclosed within the noted patent, such PRIOR ART anchor, as illustrated in FIGS. 1 and 2 of the present patent application drawings, which respectively correspond to FIGS. 5 and 3 of the noted patent, comprises an anchor 10 having a head portion 12, an elongated shank portion 16, and a pointed tip or extremity 18. A tapered helical thread 20 is provided upon the elongated shank portion 16, and a constant diameter helical protuberance or secondary thread 22 is also provided upon the elongated shank portion 16 such that the convolutions of the protuberance or secondary thread 22 are interposed between the convolutions of the helical thread 20, both sets of threads having the same pitch with root portions 24 defined between adjacent convolutions. The helical protuberance or secondary thread 22 is provided so as to radially center the anchor 10 within a bore 30 pre-drilled within masonry structure 28. When the anchor 10 is secured within the bore 30, it serves to attach or mount a workpiece or the like 32 upon the masonry structure 28.

As shown in connection with the embodiment of FIG. 1, which corresponds to FIG. 5 of the noted patent, a reaming or sizing section 40 may be provided upon the anchor 10 so as to accurately prepare or size the diameter of the bore 30 so as to effectively conform with the diametrical dimension of the centering or guide means as defined by the protuberance or secondary thread 22. A unique feature of this anchor also comprises the provision of notched regions 26 within the primary helical thread 20 of the anchor 10 so as to permit dust or aggregate particles gradually removed from the sidewall portions of the masonry structure 28 to migrate and accumulate within reservoirs 34, defined between adjacent convolutions of the primary and secondary threads 20,22, in order to effectively reduce torsional friction whereby the anchor device can be inserted into the masonry structure at relatively low torque levels. It is noted, however, that the reaming or sizing section 40 is not provided with any migratory or reservoir structure. It has therefore been experienced that when utilizing a reaming or sizing section or member upon a masonry anchor, of a type similar to that disclosed within U.S. Pat. No. 3,937,119, such dust or aggregate particles dislodged from the sidewall portions of the masonry structure during such reaming or sizing operation cannot, or are not able to, migrate to a suitable reservoir because they are in effect trapped within the plurality of spaces defined between adjacent ones of the axially extending or longitudinal splines defined upon the reaming or sizing section 40, as well as between the plurality of splines and the sidewall of the masonry bore 30. Accordingly, a considerable amount of torsional friction is developed during the insertion of such anchor into the masonry structure which results in the facts that the anchors can only be inserted into the masonry structure with relatively high torque levels, that the anchors sometimes cannot be fully inserted at all, or that the required application torque is so high that the fastener head becomes separated from the fastener shank.

A need therefore exists in the art for the development of a self-tapping masonry anchor, which may also utilize a reaming or sizing member or section, wherein dust or aggregate particles generated during the self-tapping, reaming, or sizing operations are accommodated so as to effectively reduce the torsional friction whereby the anchor device can be easily inserted into the masonry structure at relatively low torque levels.

OBJECTS OF THE INVENTION

Accordingly, it is an object of the present invention to provide a new and improved masonry anchor.

Another object of the present invention is to provide a new and improved masonry anchor which effectively overcomes the various operational disadvantages, drawbacks, or deficiencies characteristic of the PRIOR ART masonry anchors.

An additional object of the present invention is to provide a new and improved masonry anchor of the self-tapping type which may also be provided with a reaming or sizing section, and which permits the migration of dust or aggregate particles generated during the self-tapping, reaming, or sizing operations and the accommodation of the same within reservoir structure such that the torsional friction generated during the self-tapping, reaming, or sizing operations is effectively reduced.

A further object of the present invention is to provide a new and improved masonry anchor of the self-tapping type which may also be provided with a reaming or sizing section, and which permits the migration of dust or aggregate particles generated during the self-tapping, reaming, or sizing operations and the accommodation of the same within reservoir structure such that the masonry anchor can be rapidly installed, within a bore pre-drilled within the masonry structure, in accordance with substantially reduced or relatively low torque levels.

SUMMARY OF THE INVENTION

The foregoing and other objectives are achieved in accordance with the teachings and principles of the present invention through the provision of a new and improved masonry anchor which comprises a headed shank having a first set of large diameter threads formed thereon, and a second set of smaller diameter threads formed thereon, wherein the two sets of threads have the same pitch with, for example, adjacent ones of the smaller diameter threads being interposed between adjacents ones of the large diameter threads. In accordance with unique structure characteristic of the present invention, wherein the masonry anchor includes a reamer section, the end portion of the anchor is provided with a reaming tip which has a substantially rectangular configuration, when viewed from an endwise vantage point, wherein the small ends or sides have an arcuate or segmental configuration corresponding substantially to the circular dimensions or configuration of the anchor shank while the large sides are linear or planar and are disposed parallel to each other. Cutting edges are thus formed at the intersections or corners defined between the linear and arcuate ends or side portions.

The diametrical extent of the reaming tip, as defined between the oppositely disposed arcuate ends or sides, is substantially equal to that of the anchor shank, however, the diametrical or transverse extent of the reaming tip, as defined between the oppositely disposed linear or planar sides is substantially less than that of the anchor shank. Such linear or planar sides are integrally connected to the anchor shank either by means of tapered, planar or flat surfaces disposed at an angle relative to the anchor shank axis, or by means of tapered arcuate surfaces such that the smaller diameter portions of the reaming tip can be smoothly connected to the larger diameter anchor shank. In either instance, such planar or flat, or arcuate, surfaces define recessed areas, regions, or reservoirs within which dust or aggregate particles, generated during the reaming, or self-threading or self-tapping process, can accumulate and be discharged such that torsional friction, and the resulting installation torque, can be effectively reduced. Configurations or structure comprising the reaming tip, other than rectangular, are also possible, including axially extending or axially elongated recessed or flattened zones. Still further, the reamer portion may be entirely omitted whereby such reservoir structure is provided upon the end or tip portion of a self-tapping or self-threading anchor. The critical feature of the invention is the provision of the recessed regions, areas, or reservoirs for accumulating and discharging the dust or debris generated during the threading and/or reaming operations such that the axial movement of the anchor into the bore, attendant the self-threading or self-tapping engagement of the anchor with respect to the sidewalls of the masonry structure defining the pre-drilled bore, can be rapidly and easily accomplished.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts through-out the several views, and wherein.

DETAILED DESCRIPTION OF THE PREFERRED EMBODIMENT

Figure 3:
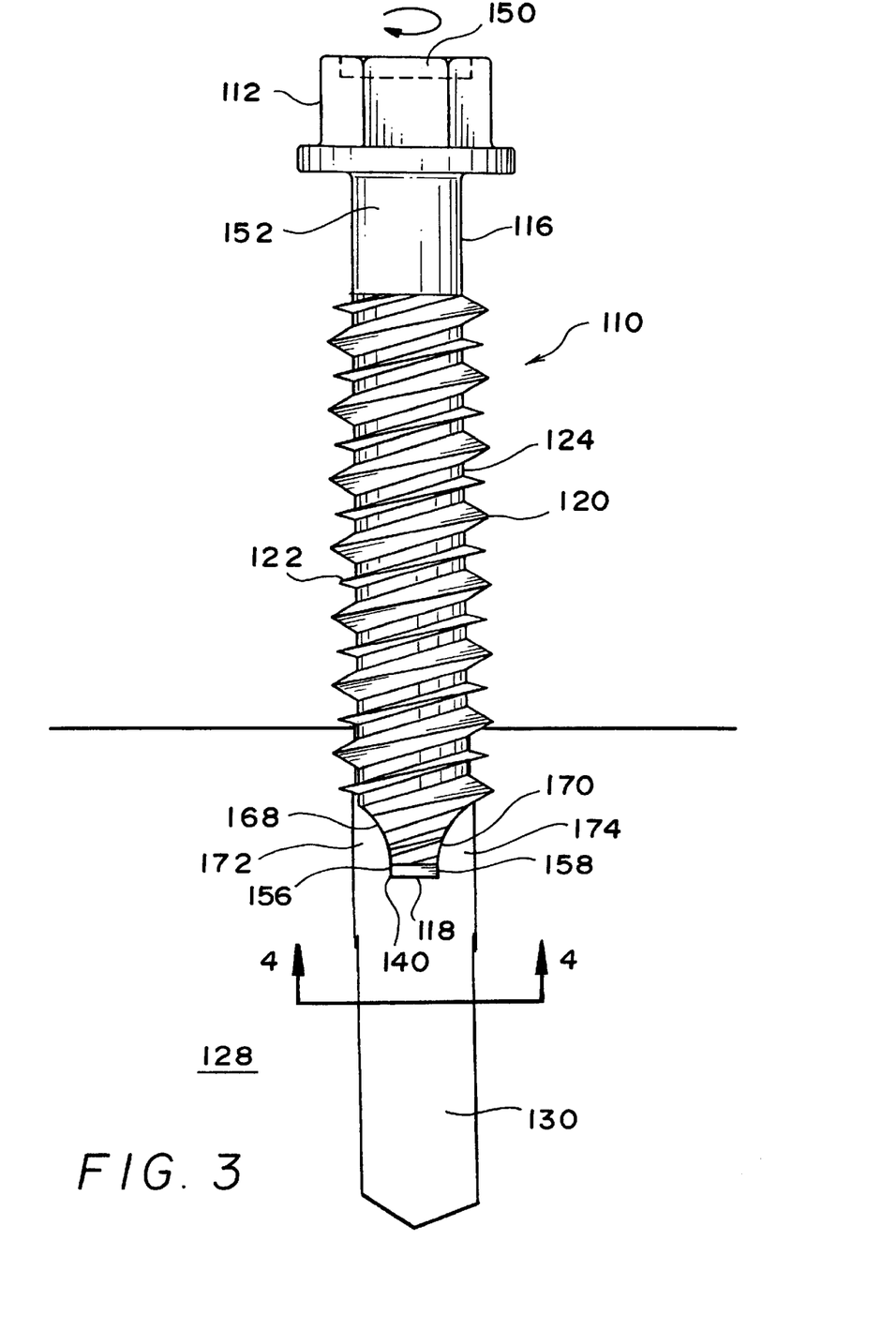
FIG. 3 is a schematic view showing a first embodiment of the new and improved masonry anchor constructed in accordance with the principles and teachings of the present invention wherein the anchor is being inserted into a bore pre-drilled within a masonry structure during a reaming and self-tapping threading operation.
Figure 5A:
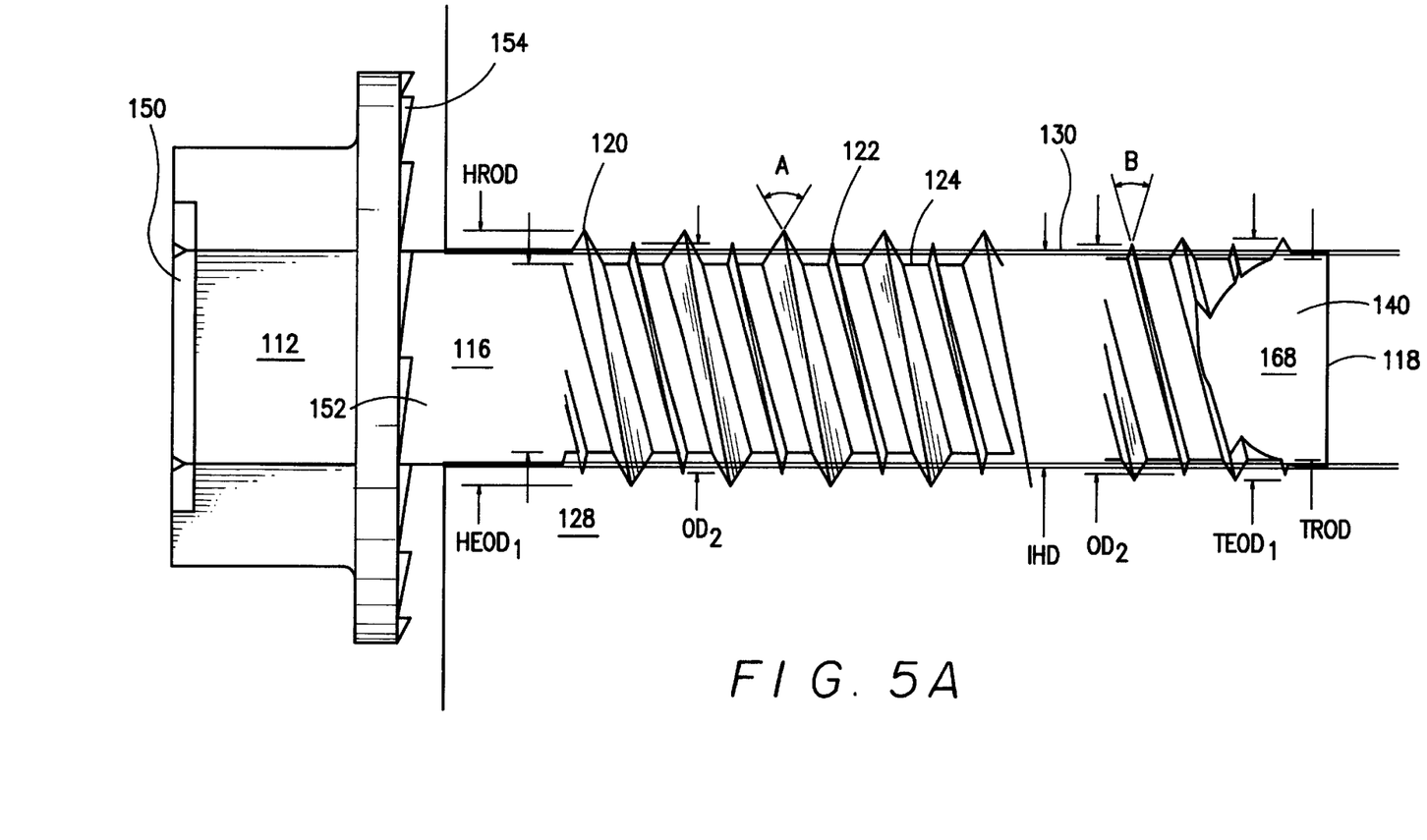
FIG. 5A an enlarged side elevational view of the first embodiment of the new and improved masonry anchor of the present invention as disclosed within FIG. 3 and illustrating the details of the masonry anchor of the present invention.

Referring now to the drawings, and more particularly to FIGS. 3 and 5A thereof, a first embodiment of a new and improved masonry anchor, constructed in accordance with the principles and teachings of the present invention, is disclosed and is generally indicated by the reference character 110. It is noted at this juncture that component parts of the new and improved masonry anchor 110, which are similar to, for example, those of the PRIOR ART masonry anchor 10 disclosed within FIGS. 1 and 2, are denoted by similar reference characters except that the reference numbers denoting the component parts of the new and improved masonry anchor 110 will be within the 100 series.

The masonry anchor 110 is thus seen to comprise a shank portion 116 which has a head portion 112 provided at a first axial end thereof, and a tip portion 118 provided at a second opposite axial end thereof. The head portion 112 may be provided, for example, with a suitable recessed socket, or the like, 150 by means of which the anchor 110 can be rotatably driven by a suitable tool, such as, for example, a hammer drill, an impact wrench, or the like, not shown. Alternatively, the head portion 112 is provided with an external periphery which has a geometrical configuration, such as, for example, that of a hexagon, whereby a suitable tool, again not shown, may rotatably turn the anchor 110 as a result of engaging the external periphery of the anchor head portion 112. Still further, the anchor 110 may be provided with suitable structure such that other driving tools, such as, for example, TORX® or a Phillips head screwdriver, may be utilized.

The shank portion 116 of the anchor 110 is seen to be threaded over a substantial axial extent thereof, and the threaded portion of the anchor is seen to commence at the tip portion 118 and extend axially toward the head portion 112 leaving a non-threaded section 152 immediately adjacent the head portion 112. The shank portion 116 of the anchor 110 may have an axial length of approximately 2.5 to 3.0 inches, and the non-threaded section 152 can suitably comprise, for example, one-sixth of such axial length, or approximately 0.375 inches. With respect to the threaded portion of the anchor 110, it is seen that the threaded portion comprises a large diameter thread portion 120, a small diameter thread portion 122, and a root portion 124. Each thread of the small diameter thread portion 122 is interposed between adjacent or successive threads of the large diameter thread portion 120, and the pitch of each one of the large and small diameter thread portions 120,122 is the same. In addition, as may best be seen from FIG. 5A, the forward and trailing surfaces or flanks of each one of the large thread portions 120 are angled with respect to each other by means of an angle A which may be, for example, 60°, and similarly, the forward and trailing surfaces or flanks of each one of the small thread portions 122 are angled with respect to each other by means of an angle B which may be, for example, 30°.

The anchor 110 is adapted to be inserted into a hole 130 which is bored within a masonry structure 128 by means of a suitable drill bit, not shown, which may be, for example, a 5/16 inch drill bit. Depending upon whether or not the drill bit is new, and therefore subject to particular manufacturer tolerances, or somewhat worn, the drill bit will bore a hole having an inner diameter dimension IHD which is within the range of 0.327–0.335 inches as is also best seen in FIG. 5A. The outer crest diameter dimension of the large diameter thread portion 120 tapers from the head end portion thereof to the tip end portion thereof and will vary from an outer crest diameter dimension $HEOD_1$ of 0.395 inches near the head portion 112 of the anchor 110 to an outer crest diameter dimension $TEOD_1$ of 0.369 inches at the tip portion 118 of the anchor 110. In a similar but reverse manner, the outer diameter of the thread root portion 124 of the anchor shank 116 tapers from the tip portion 118 of the anchor 110, wherein the outer diameter of the thread root portion 124 may have a dimension TROD of 0.310 inches, toward the head portion 112 of the anchor 110 wherein the outer diameter of the thread root portion 124 within the vicinity of the head portion 112 may have a dimension TROD of, for example, 0.290 inches in a preferred embodiment. On the other hand, the outer crest diameter dimension of the small diameter thread portion 122 is constant throughout the axial extent thereof and preferably has an outer crest diameter dimension $OD_2$ of 0.355 inches. It is therefore to be appreciated that both the outer crest diameter dimension of the large diameter thread portion 120 and the outer crest diameter dimension of the small diameter thread portion 122 are greater than the inner diameter dimension of the bore hole 130.

In this manner, when the anchor 110 is inserted into the bore hole 130, both the larger diameter thread portion 120 and the small diameter thread portion 122 will self-thread or tap into the sidewall portions of the bore hole 130. In addition, the constant outer crest diameter dimension of the small diameter thread portion 122 serves to provide centering for the anchor 110 as the same is axially inserted into the bore hole 130, while the increasingly larger outer crest diameter of the large diameter thread portion 120, and the corresponding decreasingly smaller outer diameter of the root portion 124, as one proceeds axially from the tip portion 118 toward the head portion 112, together permit or facilitate the self-tapping operation of the large diameter thread portion 120 into the sidewall portions of the bore hole 130 while generating desirable compression forces with respect to the sidewall portions of the masonry bore hole 130. Accordingly, such tapered structure of the large diameter thread portion 120, and the reversely tapered structure of the root portion 124, likewise enhance the pull-out resistance of the anchor 110 with respect to the bore hole 130. The underlying annular surface portion of the head portion 112 is further provided with a circumferential set of projections 154 which serve to bitingly engage the masonry 128 and thereby prevent retrograde rotatable movement or retraction of the anchor 110 back out of the bore hole 130 once the anchor 110 has been inserted into the bore hole 130 which has been previously drilled into the masonry structure 128 by the drill bit, not shown.

Figure 4:
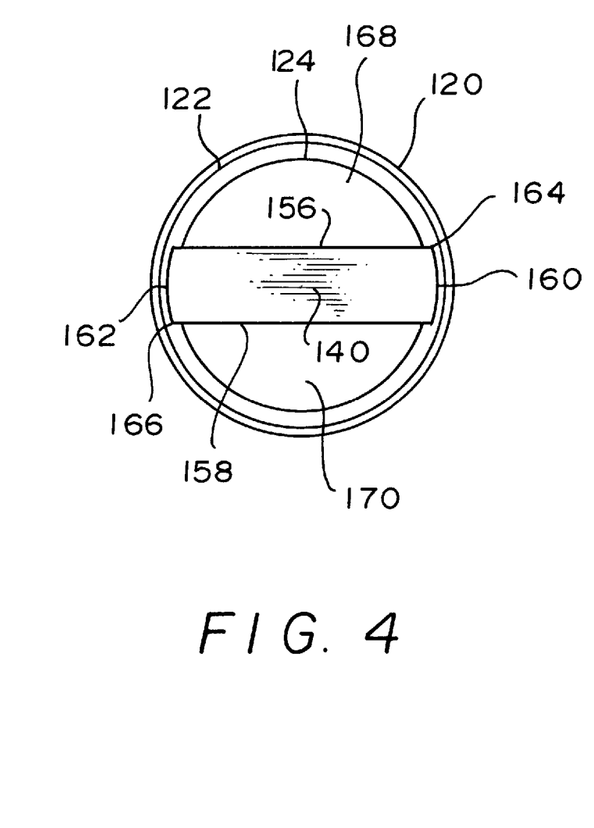
FIG. 4 is an end elevational view of the first embodiment of the new and improved masonry anchor of the present invention as shown in FIG. 3 and as taken along the lines 4—4 of FIG. 3.

In accordance with a unique structural feature of the present invention, the tip portion 118 of the masonry anchor 110 is provided with a reaming portion 140 which, as best seen in FIGS. 3 and 4, has a substantially rectangular cross-sectional configuration. More particularly, the reaming portion 140 comprises a pair of oppositely disposed planar long sides 156,158, and a pair of oppositely disposed arcuately shaped short sides 160,162. As a result of such configuration, major and minor diametrical extents are defined upon the reaming portion 140, and a pair of diametrically opposite cutting edges 164,166 are also formed at opposite corners of the reaming portion 140 as a result of the intersections of the planar long sides 156,158 and the arcuate short sides 160,162. It is to be appreciated that the major diametrical extent of the reaming portion 140 is greater than the diametrical extent of the threaded shank root portion 124, however, it is also seen that the major diametrical extent of the reaming portion 140 is less than both of the diametrical extents of the small and large diameter thread portions 120,122. The major diametrical extent of the reaming portion 140 of the anchor 110 has an outer diametrical extent or dimension which is within the range of 0.330–0.332 inches. The purpose of the reaming portion 140 is to always ensure, regardless of the tolerance or size of the drill bit used to drill the bore hole 130, and therefore regardless of the tolerance or size of the internal diameter dimension of the bore hole 130 formed by the drill bit, that the internal diameter dimension of the bore hole 130 is in fact properly sized with respect to or for the anchor 110 so as to permit or facilitate the installation of the masonry anchor 110 with a minimum amount of torsional friction and installation torque.

Figure 5B:
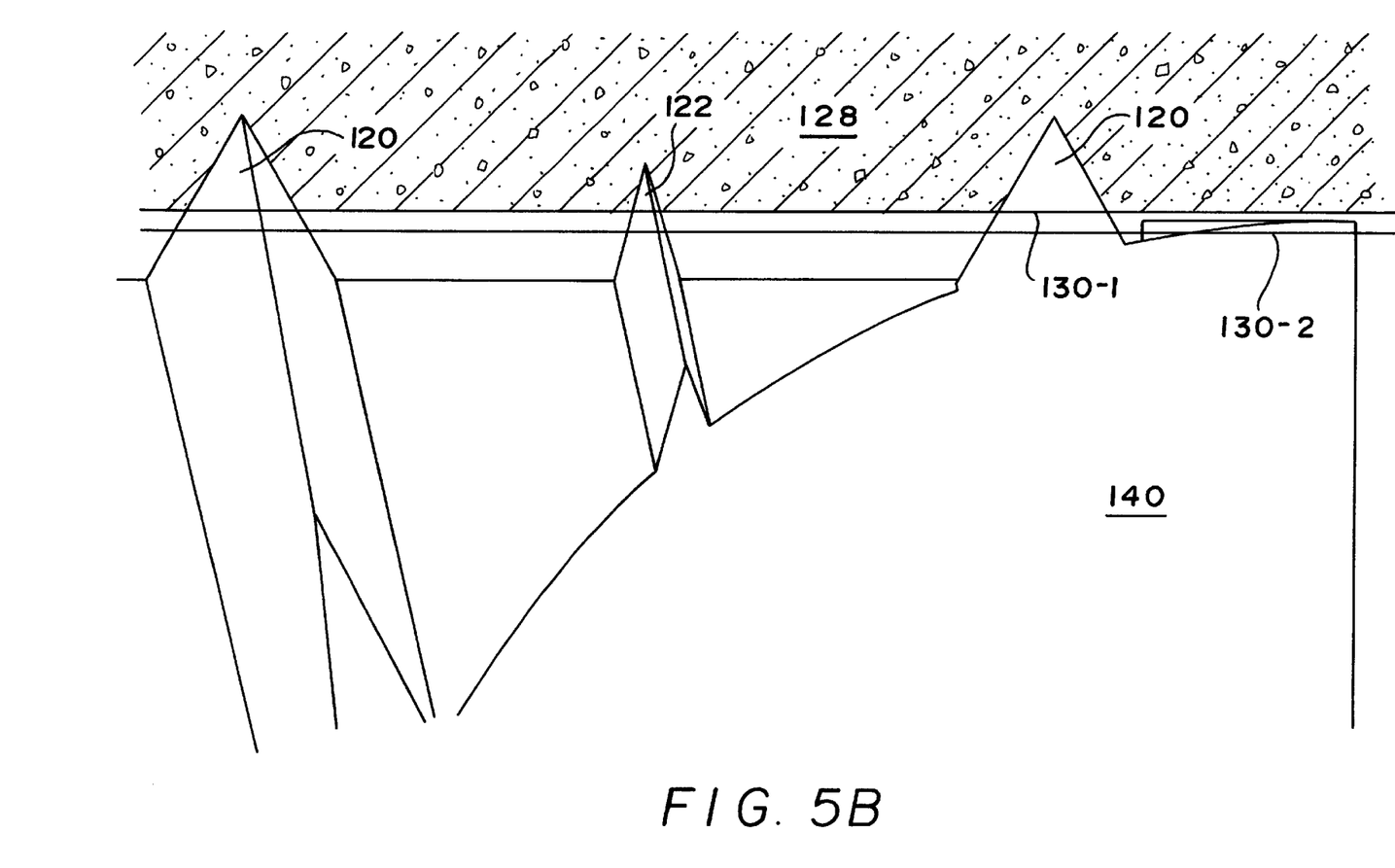
FIG. 5B is an enlarged, partial schematic view of the tip portion of the masonry anchor of FIG. 5A showing the details of the reaming portion and the large and small diameter thread portions of the masonry anchor with respect to the bore hole and sidewall portions thereof as formed within the masonry structure by means of a drill bit.

For example, if a relatively new drill bit, not shown, is used to form the bore hole 130, the drill bit will probably have an external or outer diametrical extent of 0.335 inches and will accordingly drill a bore hole 130-1, as seen in FIG. 5B, which will therefore have a corresponding inner diametrical extent or dimension. In such a case, in view of the fact that the external or outer diametrical extent of the reaming portion 140 has a maximum dimension of 0.332 inches, the bore hole 130-1 is already sufficiently sized such that when the anchor 110 is rotatably inserted into the bore hole 130-1, the reaming portion 140 need not and does not perform a reaming operation with respect to the bore hole 130-1. In addition, due to the fact that the outer diametrical crest extents or dimensions of the large and small diameter thread portions 120,122, that is, 0.369–0.395 and 0.355 inches, respectively, are greater than the inner diametrical extent or dimension of the bore hole 130-1, the large and small diameter thread portions 120,122 will properly self-thread or tap into the sidewall portions of the masonry structure 128.

On the other hand, if a relatively old or partially worn drill bit, not shown, is used to form the bore hole 130, the drill bit will probably or may have an external or outer diametrical extent of approximately 0.327 inches and will accordingly drill a bore hole 130-2, as seen in FIG. 5B, which will therefore have a corresponding inner diametrical extent or dimension. In such a case, in view of the fact that the inner diametrical extent or dimension of the bore hole 130-2 is substantially less than the inner diametrical extent or dimension of the bore hole 130-1, the bore hole 130-2 is not properly sized and is in fact undersized with respect to a desirable inner diametrical extent or dimension. Consequently, when the anchor 110 is attempted to be rotatably inserted into the bore hole 130-2 having such an improperly or undersized inner diametrical extent or dimension, a substantial amount of torsional friction or installation torque would be required in order to achieve insertion of the anchor 110 into the bore hole 130-2 of the masonry structure 128. Accordingly, by providing the reaming portion 140 upon the masonry anchor 110, wherein the reaming portion 140 has an external or outer diametrical extent or dimension of 0.332 inches, as the anchor 110 is rotatably driven into the bore hole 130-2, the reaming portion 140 performs a reaming operation with respect to the bore hole 130-2 and enlarges the same such that the resulting bore hole has an inner diametrical extent or dimension of approximately 0.332 inches. The bore hole 130-2 is now in fact properly or sufficiently sized such that when the large and small diameter thread portions 120,122, having the aforenoted outer diametrical crest extents or dimensions of, for example, 0.369–0.395 and 0.355 inches, respectively, begin to encounter the sidewall portions of the bore hole 130-2, the large and small diameter thread portions 120,122 will be able to properly self-thread or tap into the sidewall portions of the masonry structure 128 without requiring a substantial amount of installation torque as a result of not encountering an excessive or inordinate amount of torsional friction. It is thus appreciated further that regardless of the degree of wear characteristic of the particular drill bit used to form the bore hole 130-2, the reaming portion 140 of the particular anchor 100 being inserted or installed within the bore hole 130-2 will always correctly or properly size the bore hole 130-2 so as to permit or facilitate insertion or installation of the anchor 110 within the bore hole 130-2.

In accordance with the aforenoted unique structure of the reaming portion 140 of the masonry anchor 110, comprising its substantially rectangular configuration, and as best appreciated from FIG. 3, the reaming portion 140 of the masonry anchor 110 further comprises or has operatively associated therewith a pair of arcuate surfaces 168,170 which integrally interconnect or smoothly blend the planar long sides 156, 158 of the reaming portion 140 with, for example, the anchor thread root portion 124 and/or the large and small diameter thread portions 120,122. The arcuate surfaces 168,170 are disposed axially upstream of the reaming portion 140 as one proceeds in the direction of insertion of the anchor 110 into the masonry structure 128, and are in effect recessed or disposed radially inwardly from the outer peripheral surface portions of the shank portion 116 as defined, for example, by means of the root portion 124 or the large and small diameter thread portions 120,122.

As a result of the provision or disposition of the arcuate surfaces 168,170 in connection with the reaming portion 140, and the radially inward or recessed disposition of such arcuate surfaces 168,170 with respect to the outer peripheral surface portions of the shank portion 116, recessed regions or reservoirs 172,174 are in effect defined or created between such arcuate surfaces 168,170 and the sidewall portions of the bore hole 130 whereby concrete dust and other debris, created or generated by means of both the self-tapping or self-threading and the reaming operations, can effectively be permitted to migrate to, and accumulate within, such recessed or reservoir regions so as to be ultimately discharged from such regions to the bottom of the bore hole 130. In this manner, as a result of such migration, accumulation, and discharge of the masonry dust and other debris or particles generated during the reaming and self-tapping or self-threading operations, the torsional friction and installation torque characteristic of the masonry anchor installation operation are substantially reduced.

Figure 6:
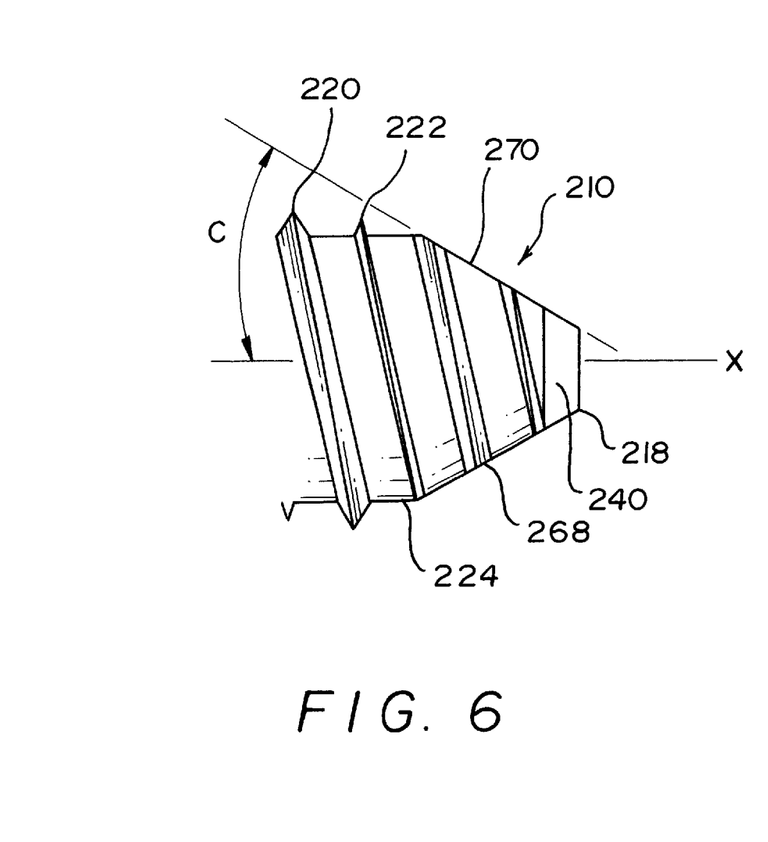
FIG. 6 a side elevational view of a second embodiment of a new and improved masonry anchor constructed in accordance with the principles and teachings of the present invention.
Figure 7:
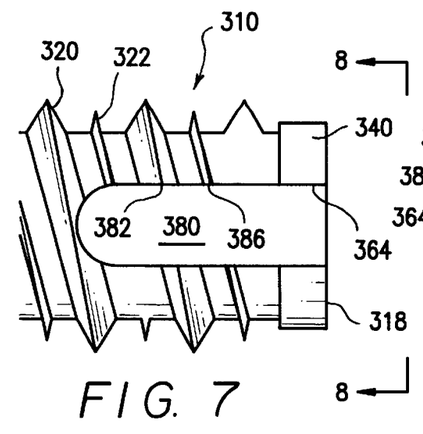
FIG. 7 is a partial side elevational view of a third embodiment of a new and improved masonry anchor constructed in accordance with the principles and teachings of the present invention.
Figure 8:
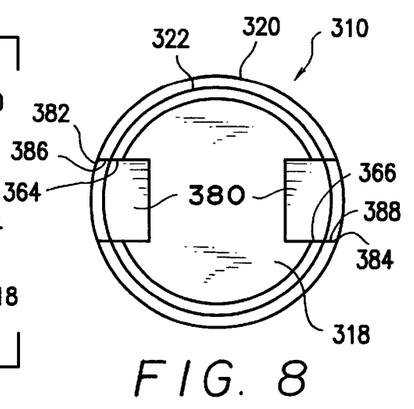
FIG. 8 is an end elevational view of the third embodiment of the new and improved masonry anchor of the present invention as shown in FIG. 7 and as taken along the lines 8—8 of FIG. 7.

While the foregoing structure of the recessed surface portions 168,170 operatively associated with the reaming portion 140 is preferred, other structural configurations may be utilized in lieu of, for example, the arcuate surface regions or portions 168,170 interconnecting the reaming portion 140 to the radially outer surface portions of the shank portion 116. As shown in FIG. 6, a second embodiment of a masonry anchor, constructed in accordance with the principles and teachings of the present invention, is disclosed and is generally indicated by the reference character 210. This masonry anchor 210 is essentially identical to the first embodiment of the masonry anchor 110 as shown, for example, in FIG. 3, and therefore is seen to include tip portion 218, the large and small diameter thread portions 220,222, root portion 224, and reaming portion 240. However, in lieu of the arcuate surface portions 168,170 operatively associated with the reaming portion 140 of such first embodiment of the masonry anchor 110, the masonry anchor 210 comprises planar surfaces 268,270 which are inclined at a predetermined angle C, with respect to the longitudinal axis X of the anchor 210, which may be, for example, 35°. As can be readily appreciated, the inclined planar surfaces 268,270, in a manner similar to the arcuate surfaces 168,170, are recessed or disposed radially inwardly with respect to the outer peripheral surface portions of the anchor 210 and therefore the provision of such planar surfaces 268,270 in connection with the reaming portion 240 of the anchor 210 will still create or define recessed or reservoir regions, similar to the recessed or reservoir regions 172,174, between the planar surfaces 268,270 and the inner peripheral sidewall portions of the bore hole 130 whereby the operational benefits of the anchor 210, with respect to the installation of the same within the masonry structure 128, will likewise be able to be achieved.

In connection with the actual fabrication of either one the masonry anchors 110,210 of the present invention, the anchors 110,210 are formed by first cutting a cylindrical blank or slug to a predetermined sized such that the same serves as the anchor shank portion, and subsequently, the shank blank or slug is headed so as to form the head portion, for example, 112. The shank blank or slug is then subjected to a thread-rolling operation whereby the large diameter and small diameter threads 120,122 or 220,222 are formed thereon, and lastly, the arcuate or planar surface portions 168,170 or 268,270 are formed upon the tip portions 118,228 of the anchors 110, 210 by means of a suitable milling, forging, or heading operation. Alternatively, the order in which the various operations are to be performed may be varied. For example, the heading, forging, or milling operations may be performed before the threading operations, or the heading of the anchor may be performed first, followed by the milling or forging operations, and lastly, the thread forming operations may be performed. It is to be noted further that in lieu of having only two arcuate or planar surface portions 168,170 or 268,270 in connection with the reaming portions 140,240 of the anchors 110,210, the reaming portions 140,240 of the anchors 110,210 may have associated therewith, for example, three arcuate or planar surface portions whereby three cutting or reaming edges, and three dust particle or debris reservoirs, will be formed upon the particular anchor.

With reference now being made to FIGS. 7–12, additional third, fourth, and fifth embodiments of new and improved reamer-type masonry anchors constructed in accordance with the principles and teachings of the present invention are disclosed. Considering firstly the third embodiment of the new and improved masonry anchor of the present invention as disclosed within FIGS. 7 and 8, the third embodiment of the new and improved masonry anchor of the present invention is disclosed and generally indicated by the reference character 310, it being noted that for purposes of this disclosure, only the reamer tip end portion of the masonry anchor 310 is actually disclosed in view of the fact that the variation in the masonry anchor 310 which constitutes the third embodiment of the invention, and as compared to the masonry anchors 110,210 respectively disclosed within FIGS. 3–6, resides within the reamer tip end portion of the masonry anchor. Accordingly, it is seen that the reaming portion is disclosed at 340, however, in lieu of the substantially rectangularly configured reaming portions 140,240 of the first and second masonry anchors 110,210 as respectively disclosed within FIGS. 3–5B, and 6, the reaming portion 340 is seen to comprise a substantially cylindrical structure. Still further, in lieu of the arcuate or planar recessed reservoir portions 168,170, and 268,270 provided upon the masonry anchors 110,210 as respectively disclosed within FIGS. 3–5B and 6, the reaming end portion of the masonry anchor 310 is provided with a pair of diametrically opposed, axially extending recesses or cut-out regions 380, 380 which extend from the masonry anchor tip face 318 toward the head portion, not shown, and serve to define the dust and debris collection or accumulation reservoirs. As a result of the provision of such recessed or cut-out regions 380,380, which may be formed by means of a suitable forging process, diametrically opposite cutting edges 364, 366 are formed upon the reaming portion 340. The axial length of the recessed or cut-out reservoir regions 380,380 may be, for example, approximately 0.5 inches, and since the recessed or cut-out reservoir regions 380,380 extend into the axial regions at which the large and small diameter thread portions 320,322 are provided upon the masonry anchor 310, diametrically opposite thread cutting edges 382,384, and 386,388 are respectively defined with respect to the large diameter and small diameter thread portions 320,322. It is lastly noted that while two diametrically opposed recessed or cut-out regions 380,380 are disclosed in connection with masonry anchor 310, three such recessed or cut-out regions, angularly disposed at 120° intervals with respect to each other, may be provided upon the masonry anchor 310, or still further, four such recessed or cut-out regions, angularly disposed at 90° intervals with respect to each other, may also be provided upon the masonry anchor 310.

Figure 9:
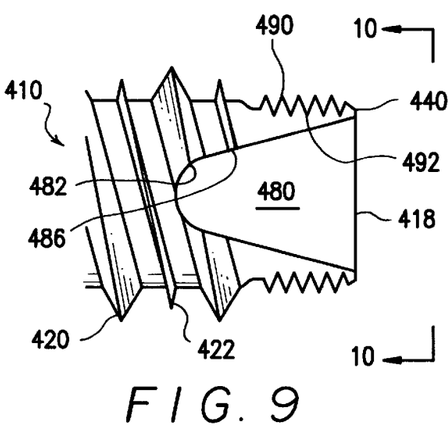
FIG. 9 is a partial side elevational view of a fourth embodiment of a new and improved masonry anchor constructed in accordance with the principles and teachings of the present invention.
Figure 10:
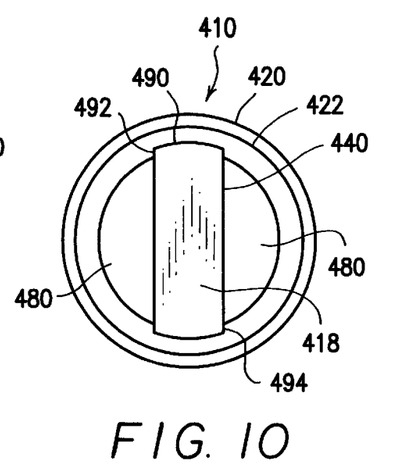
FIG. 10 is an end elevational view of the fourth embodiment of the new and improved masonry anchor of the present invention as shown in FIG. 9 and as taken along the lines 10—10 of FIG. 9.

With reference now being made to FIGS. 9 and 10, a fourth embodiment of a masonry anchor constructed in accordance with the principles and teachings of the present invention is disclosed and is generally indicated by the reference character 410, it again being noted that for purposes of this disclosure, only the reamer tip end portion of the masonry anchor 410 is actually disclosed in view of the fact that the variation in the masonry anchor 410 which constitutes the fourth embodiment of the invention, and as compared to the masonry anchors 110,210,310 respectively disclosed within FIGS. 3–8, resides within the reamer tip end portion of the masonry anchor.

More particularly, it is seen that the masonry anchor 410 is provided with a reaming portion 440 which is seen to be somewhat similar to the reaming portion 140 of the first embodiment masonry anchor 110 as disclosed within FIGS. 3–5B in that the reaming portion 440 is substantially rectangular, however, in lieu of the diametrically oppositely disposed single cutting edges 164, 166 which are defined at the diametrically opposed corner portions of the reaming portion 140, the relatively small arcuate ends 460, 462 of the reaming portion 440 of this embodiment are externally threaded as at 490 such that the a plurality of diametrically opposite cutting edge portions 492,494 of the external threads 490 are provided or formed at each diametrically opposite corner region of the reaming portion 440 for performing the reaming operation. In addition, diametrically opposite recessed regions 480,480, which may either have an arcuate configuration similar to the arcuate portions 168,170 of the first embodiment shown in FIGS. 3–5B, or a planar configuration similar to the planar portions or surfaces 268,270 of the second embodiment shown in FIG. 6, are provided so as to define the dust or debris collection reservoirs for accumulating and discharging the dust and debris generated during the reaming and self-tapping or self-threading operations.

Figure 11:
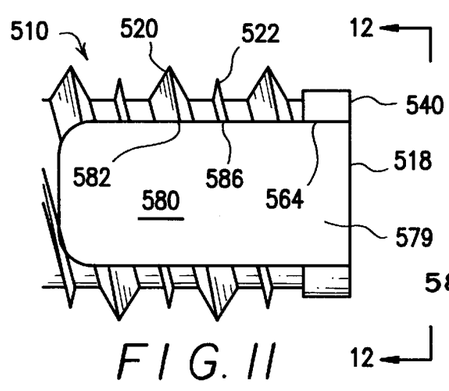
FIG. 11 is a partial side elevational view of a fifth embodiment of a new and improved masonry anchor constructed in accordance with the principles and teachings of the present invention.
Figure 12:
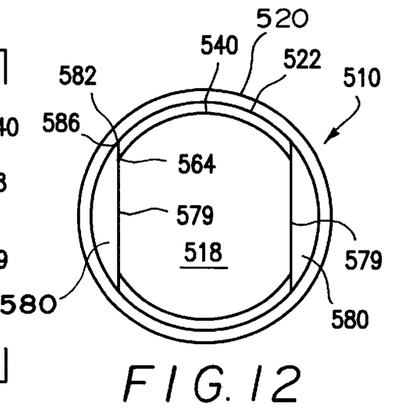
FIG. 12 is an end elevational view of the fifth embodiment of the new and improved masonry anchor of the present invention as shown in FIG. 11 and as taken along the lines 12—12 of FIG. 11.

A fifth embodiment of a masonry anchor constructed in accordance with the principles and teachings of the present invention is disclosed within FIGS. 11 and 12 and is generally indicated by the reference character 510, it again being noted that for purposes of this disclosure, only the reamer tip end portion of the masonry anchor 510 is actually disclosed in view of the fact that the variation in the masonry anchor 510 which constitutes the fifth embodiment of the invention, and as compared to the masonry anchors 110, 210,310,410 respectively disclosed within FIGS. 3–10, resides within the reamer tip end portion of the masonry anchor. More particularly, it is seen that in a manner somewhat similar to the third embodiment masonry anchor 310, as disclosed within FIGS. 7 and 8, the fifth embodiment of a masonry anchor 510 constructed in accordance with the principles and teachings of the present invention is seen to comprise a reamer portion 540, however, in lieu of the axially extending recessed portions or channels 380,380, a pair of axially extending, diametrically opposite planar surfaces 579,579 are formed upon diametrically opposite external side wall portions of the anchor 510 such that in effect a pair of radially recessed reservoir portions 580,580 for accumulating and discharging dust and debris generated by means of the reaming and self-threading or self-tapping operations are formed. The axial length of the dust or debris accumulation reservoirs 580,580 may be similar to that of the dust or debris accumulation reservoirs 380,380 of the third embodiment of the masonry anchor invention as disclosed within FIGS. 7 and 8, as well as that of the dust or debris accumulation reservoirs 480,480 of the fourth embodiment of the masonry anchor as disclosed within FIGS. 9 and 10.

Figure 13A:
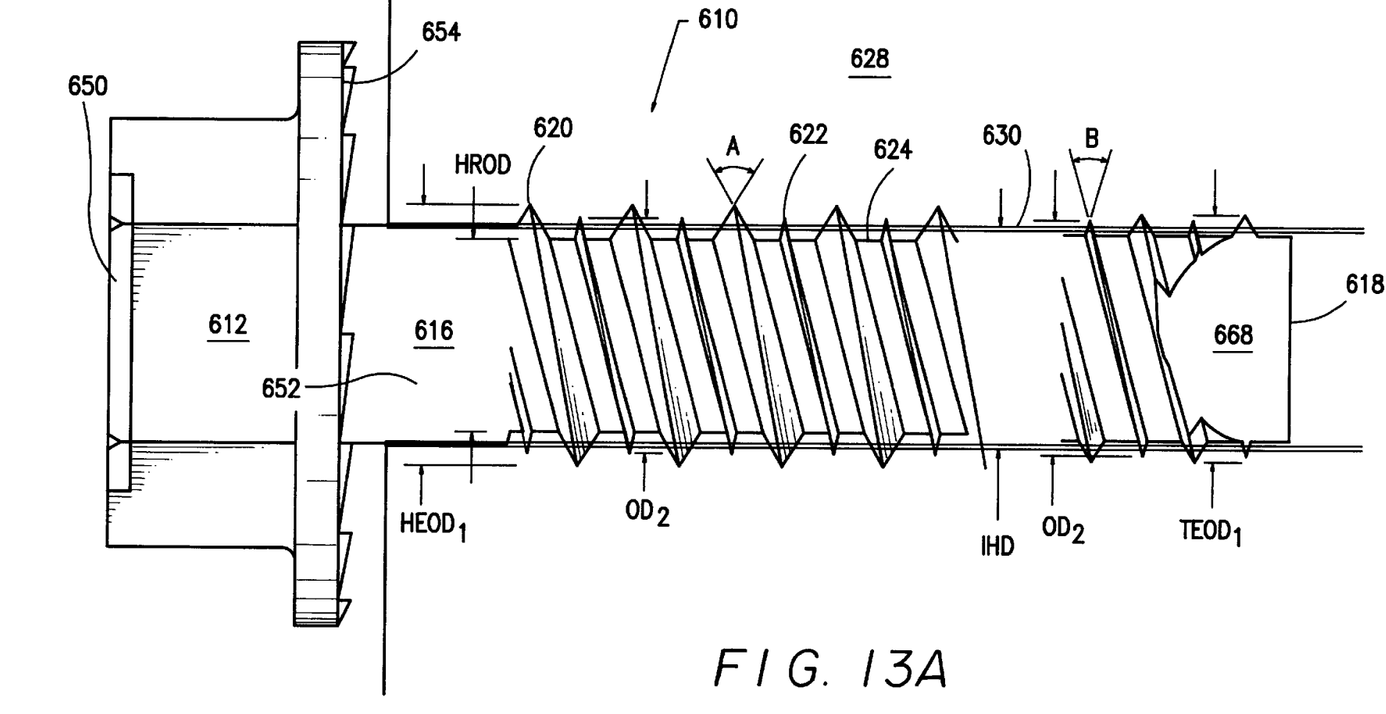
FIG. 13A is an enlarged side elevational view of a sixth embodiment of a new and improved masonry anchor constructed in accordance with the principles and teachings of the present invention.
Figure 13B:
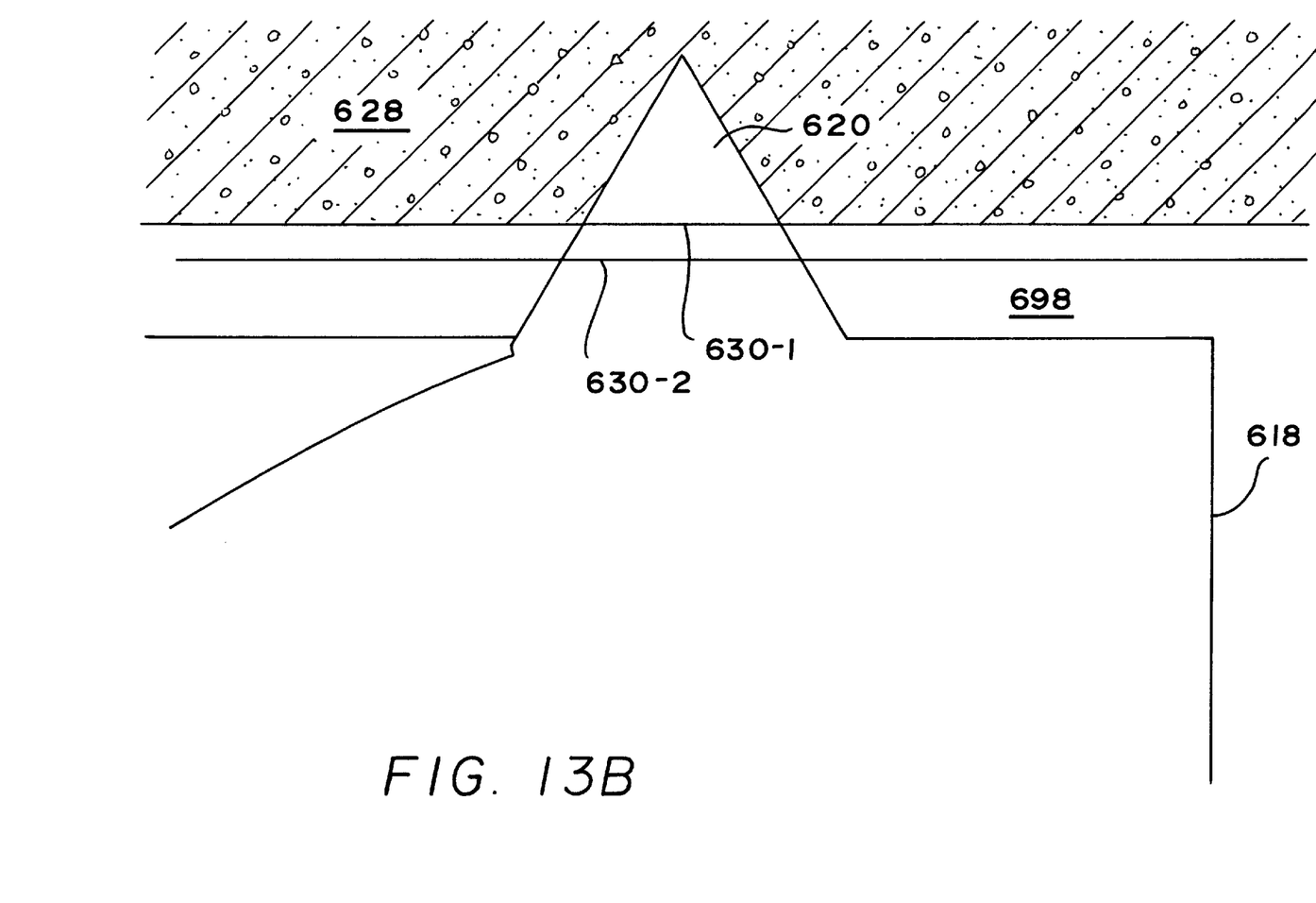
FIG. 13B is an enlarged, partial schematic view of the tip portion of the new and improved masonry anchor of FIG. 13A showing the details of the self-tapping or self-threading portions of the masonry anchor with respect to the bore hole and sidewall portions thereof as formed within the masonry structure by means of a drill bit.

With reference lastly being made to FIGS. 13A and 13B, a sixth embodiment of a masonry anchor constructed in accordance with the principles and teachings of the present invention is disclosed and is generally indicated by the reference character 610. It is noted that the masonry anchor 610 is essentially identical to the masonry anchor 110 disclosed within FIGS. 5A and 5B wherein the only significant difference between the anchors 110,610 resides in the fact that the anchor 610 does not comprise a reaming portion 140. Such can readily be seen from FIG. 13B wherein it is disclosed that the outer diameter of the tip portion 618 is radially spaced from the internal side wall of the masonry structure 628 defining the bores 630-1,630-2 as at 698 whereby the tip portion 618 of the masonry anchor 610 does not perform a reaming function.

The principles and teachings characteristic of the present invention, wherein dust and/or debris accumulation and discharge reservoirs are provided upon masonry anchors may likewise be applied to those masonry anchors which are simply self-tapping or self-threading but which also do not comprise reaming portions. Accordingly, while the masonry anchor 610 does not comprise a reaming portion, nevertheless, as an example, diametrically opposite arcuate surface portions 668 are provided upon diametrically opposite sides of the anchor 610 and are seen to extend axially rearwardly from the tip portion 618 of the anchor 610 toward the head portion 612 thereof. In this manner, even though anchors such as the masonry anchor 610 are not provided with reaming portions, such masonry anchors 610 nevertheless generate debris and dust as a result of the self-threading or self-tapping operations of the large and small diameter thread portions 620,622. Accordingly, the provision of the dust or debris accumulation and discharge reservoirs 668 permit such dust and debris to be accumulated and efficiently discharged whereby the masonry anchors 610 may be inserted within the bore 630 of the masonry structure 628 in a relatively easy manner and without requiring the expenditure of a relatively large amount of torque. It is also to be noted that while recessed portions 668 have been noted as being arcuate in configuration in a manner similar to the arcuate portions 168,170 of the first embodiment of the masonry anchor 110, the recessed portions 668 could likewise have planar, cutout, or other similar structure as disclosed, for example, in connection with the other masonry anchor embodiments 210, 310,410, and 510 of the present invention.

Thus, it may be seen that in accordance with the teachings and principles of the present invention, a new and improved masonry anchor has been developed and disclosed whereby, for example, a reaming portion is provided upon the anchor for ensuring that a bore hole, into which the anchor is to be inserted or installed, will always be of the proper or desirable size. In addition, the reaming portion has associated therewith arcuate or planar inclined surface portions, or otherwise configured recessed portions, which effectively define reservoir portions with respect to sidewall portions of the bore hole such that masonry dust or other debris, generated during the reaming and self-tapping or self-threading operations, is able to migrate toward and be accumulated within such reservoirs or recessed portions. In this manner, torsional friction and the installation torque normally required to install the anchor within the masonry bore hole is substantially eliminated or reduced. Similar recessed or reservoir structure is also disclosed in connection with self-tapping or self-threading masonry anchors which do not have reaming portions operatively associated therewith whereby debris and dust attendant self-tapping or self-threading operations can likewise be readily accumulated and discharged so as to positively influence anchor installation techniques or operations and the requisite levels of torque which must be exerted attendant the installation of the anchors within masonry structure.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A masonry anchor for insertion into a masonry structure, comprising:

a shank portion having an outer peripheral surface portion;

a head portion formed upon a first end of said shank portion;

a tip portion formed upon a second opposite end of said shank portion;

a reaming portion disposed adjacent to said tip end portion of said shank portion and comprising a pair of diametrically opposite cutting edges;

a threaded portion formed upon said outer peripheral surface portion of said shank portion intermediate said head and tip portions; and surface portions, interconnecting said reaming portion and said threaded portion of said shank portion, and recessed radially inwardly from said outer peripheral surface portion of said shank portion, for defining recessed reservoir regions for accumulating dust and debris generated during an insertion operation of said masonry anchor into the masonry structure.

2. The masonry anchor as set forth in claim 1, wherein: said surface portions comprise arcuate surface portions.

3. The masonry anchor as set forth in claim 1, wherein: said surface portions comprise planar surface portions.

4. The masonry anchor as set forth in claim 1, wherein: said reaming portion has a substantially rectangular cross-sectional configuration.

5. The masonry anchor as set forth in claim 4, wherein: said substantially rectangular reaming portion comprises a pair of short sides and a pair of long sides; and said surface portions interconnect said pair of long sides of said reaming portion to said threaded portion of said shank portion.

6. The masonry anchor as set forth in claim 5, wherein:

said threaded portion of said anchor comprises a large diameter threaded portion and a small diameter threaded portion, wherein both of said large diameter and small diameter threaded portions are self-tapping threaded portions for performing self-tapping operations within the masonry structure.

7. The masonry anchor as set forth in claim 6, wherein:

said reaming portion has a predetermined outer diametrical extent which is less than the outer diametrical extents of both said large and small diameter threaded portions so as to permit both of said large and small diameter threaded portions to self-tap threads within sidewall portions of a bore pre-drilled within the masonry structure and reamed by said reaming portion of said anchor.

8. The masonry anchor as set forth in claim 1, wherein:

said threaded portion of said anchor comprises a large diameter threaded portion and a small diameter threaded portion, wherein both of said large diameter and small diameter threaded portions are self-tapping threaded portions for performing self-tapping operations within the masonry structure.

9. The masonry anchor as set forth in claim 1, wherein:

said surface portions defining said recessed reservoir regions comprise axially extending cut-out portions defined within diametrically opposite side portions of said shank portion.

10. The masonry anchor as set forth in claim 1, wherein:

said surface portions defining said recessed reservoir regions comprise axially extending planar surface portions defined within diametrically opposite side portions of said shank portion.

11. The masonry anchor as set forth in claim 1, wherein:

said reaming portion is externally threaded.

12. A masonry anchor for insertion into a masonry structure, comprising:

a shank portion having an outer peripheral surface portion;

a head portion formed upon a first end of said shank portion;

a tip portion formed upon a second opposite end of said shank portion;

a reaming portion disposed adjacent to said tip end portion of said shank portion and comprising a pair of diametrically opposite cutting edges;

a threaded portion formed upon said shank portion intermediate said head and tip portions; and surface portions, disposed axially upstream of said tip portion as considered in the direction of insertion of said masonry anchor within the masonry structure, interconnecting said reaming portion and said threaded portion of said shank portion, and recessed radially inwardly from said outer peripheral portion of said shank portion, for defining recessed reservoir regions for accumulating dust and debris generated during an insertion operation of said masonry anchor into the masonry structure.

13. The masonry anchor as set forth in claim 12, wherein: said surface portions comprise arcuate surface portions.

14. The masonry anchor as set forth in claim 12, wherein: said surface portions comprise planar surface portions.

15. The masonry anchor as set forth in claim 12, wherein:

said reaming portion has a substantially rectangular cross-sectional configuration.

16. The masonry anchor as set forth in claim 15, wherein:

said substantially rectangular reaming portion comprises a pair of short sides and a pair of long sides; and said surface portions interconnect said pair of long sides of said reaming portion to said threaded portion of said shank portion.

17. The masonry anchor as set forth in claim 16, wherein:

said threaded portion of said anchor comprises a large diameter threaded portion and a small diameter threaded portion, wherein both of said large diameter and small diameter threaded portions are self-tapping threaded portions for performing self-tapping operations within the masonry structure.

18. The masonry anchor as set forth in claim 17, wherein:

said reaming portion has a predetermined outer diametrical extent which is less than the outer diametrical extents of both said large and small diameter threaded portions so as to permit both of said large and small diameter threaded portions to self-tap threads within sidewall portions of a bore pre-drilled within the masonry structure and reamed by said reaming portion of said anchor.

19. The masonry anchor as set forth in claim 12, wherein:

said threaded portion of said anchor comprises a large diameter threaded portion and a small diameter threaded portion, wherein both of said large diameter and small diameter threaded portions are self-tapping threaded portions for performing self-tapping operations within the masonry structure.

20. The masonry anchor as set forth in claim 12, wherein:

said surface portions defining said recessed reservoir regions comprise axially extending cut-out portions defined within diametrically opposite side portions of said shank portion.

21. The masonry anchor as set forth in claim 12, wherein:

said surface portions defining said recessed reservoir regions comprise axially extending planar surface portions defined within diametrically opposite side portions of said shank portion.

22. The masonry anchor as set forth in claim 12, wherein:

said reaming portion is externally threaded.

23. A method of forming a masonry anchor for insertion into a masonry structure, comprising the steps of:

cutting a cylindrical blank to a predetermined length so as to form an anchor shank portion having an outer peripheral surface portion;

providing a head portion upon a first end of said shank portion;

providing a tip portion upon a second opposite end of said shank portion;

providing a reaming portion adjacent to said tip end portion of said shank portion wherein said reaming portion comprises a pair of diametrically opposite cutting edges;

providing a threaded portion upon said shank portion intermediate said head and tip portions by means of a thread rolling operation; and providing surface portions upon said shank portion of said anchor such that said surface portions interconnect said reaming portion to said threaded portion of said shank portion and are recessed radially inwardly from said outer peripheral portion of said shank portion so as to define recessed reservoir regions for accumulating dust and debris generated during an insertion operation of said masonry anchor into the masonry structure.

24. The method as set forth in claim 23, further comprising the step of:

forming said surface portions such that said surface portions have arcuate configurations.

25. The method as set forth in claim 23, further comprising the step of:

forming said surface portions such that said surface portions have planar configurations.

26. The method as set forth in claim 23, further comprising the step of:

forming said reaming portion such that said reaming portion has a substantially rectangular cross-sectional configuration.

27. The method as set forth in claim 26, further comprising the step of:

forming said substantially rectangular reaming portion such that said reaming portion comprises a pair of short sides and a pair of long sides; and forming said surface portions such that said surface portions interconnect said pair of long sides of said reaming portion to said threaded portion of said shank portion.

28. The method as set forth in claim 26, further comprising the step of:

forming said threaded portion of said anchor such that said threaded portion of said anchor comprises a large diameter threaded portion and a small diameter threaded portion wherein both of said large diameter and small diameter threaded portions are self-tapping threaded portions for performing self-tapping operations within the masonry structure.

29. The method as set forth in claim 28, further comprising the step of:

forming said reaming portion of said anchor such that said reaming portion has a predetermined outer diametrical extent which is less than the outer diametrical extents of both said large and small diameter threaded portions so as to permit both of said large and small diameter threaded portions to self-tap threads within sidewall portions of a bore pre-drilled within the masonry structure and reamed by said reaming portion of said anchor.

30. The method as set forth in claim 23, further comprising the step of:

forming said surface portions defining said recessed reservoir regions as axially extending cut-out portions defined within diametrically opposite side portions of said shank portion.

31. The method as set forth in claim 23, further comprising the step of:

forming said surface portions defining said recessed reservoir regions as axially extending planar surface portions defined within diametrically opposite side portions of said shank portion.

32. The method as set forth in claim 23, further comprising the step of:

providing said reaming portion with an externally threaded portion.

33. The method as set forth in claim 23, further comprising the step of:

forming said threaded portion of said anchor such that said threaded portion of said anchor comprises a large diameter threaded portion and a small diameter threaded portion wherein both of said large diameter and small diameter threaded portions are self-tapping threaded portions for performing self-tapping operations within the masonry structure.

* * * * *